United States Patent Office 2,827,657
Patented Mar. 25, 1958

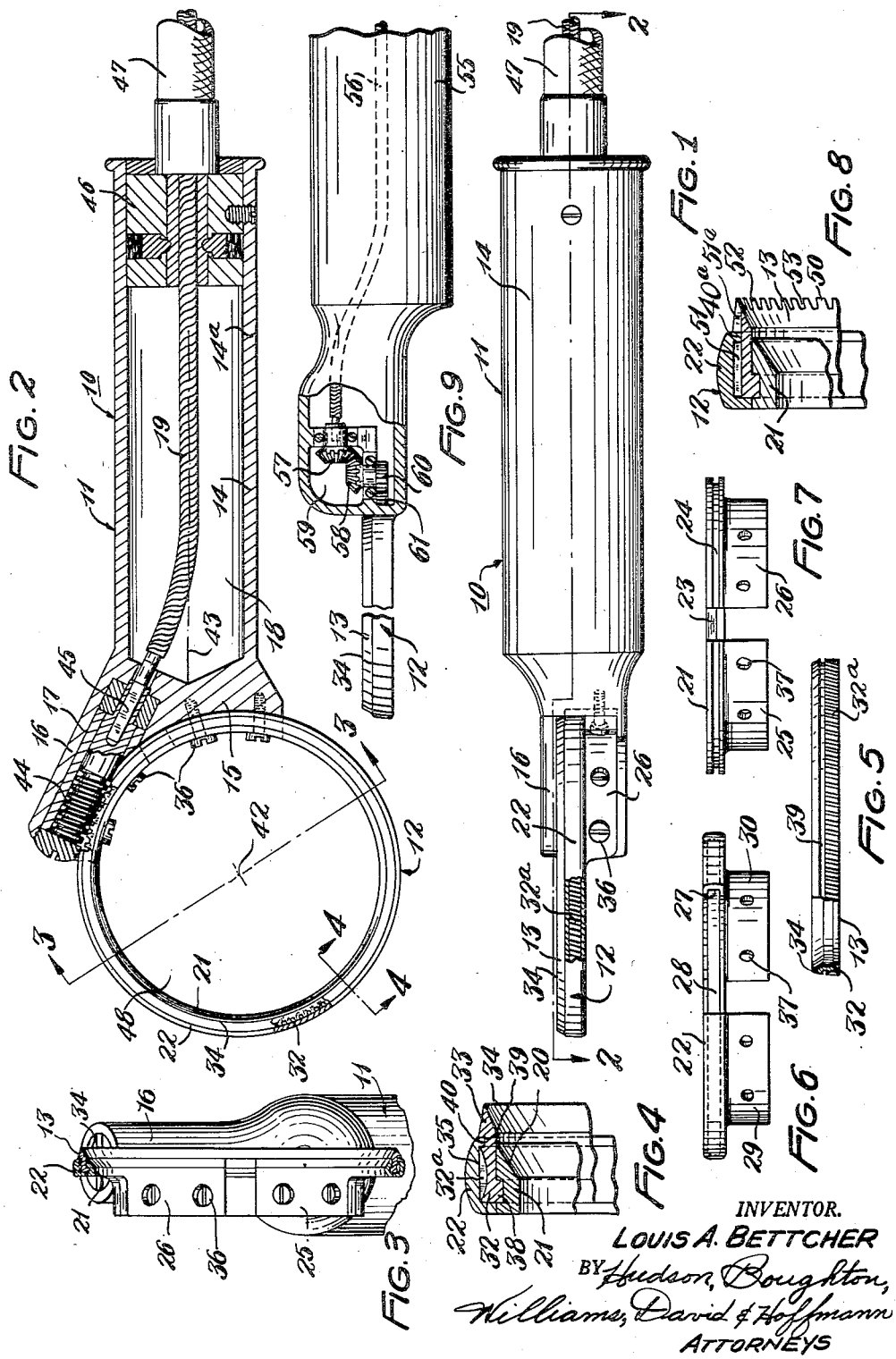

2,827,657

BONING KNIFE

Louis A. Bettcher, Cleveland, Ohio, assignor to Bettcher Industries, Inc., Cleveland, Ohio, a corporation of Ohio Application April 9, 1954, Serial No. 422,109

15 Claims. (Cl. 17—1)

This invention relates generally to meat cutting tools, and more specifically, to a cutting tool adapted to be manually held and manipulated for the quick and easy removal of meat from animal carcasses or meat remnants from animal bones.

It is also desirable to be able to remove meat remnants remaining on bones so as to recover such meat for further processing and thus avoid waste. Because of the variable size and irregular contour of animal bones carrying such meat remnants, for example neck bones, as well as variation in the size and shape of such remnants themselves, it has heretofore been slow and tedious work to remove such remnants.

The present invention, accordingly, provides a novel boning knife of a simple and economical construction and by which such a roughing operation or the removal of meat remnants from bones can be quickly and easily carried out.

Another object is to provide a novel boning knife having a substantially circular cutter rotatably driven in its own plane and mounted on a handle means in such relation thereto that the knife can be manually held and manipulated with great facility and with maximum comfort and convenience for the user.

Still another object is to provide such a boning knife in which the cutter is a ring-shaped blade rotatable in the direction of its circumference and about a central axis which extends substantially normal to the plane of the blade and transversely to the longitudinal axis of the handle means.

A further object is to provide a boning knife of the character mentioned above, in which the blade is carried by a support ring and is driven by rotary driving means located in a handle means which is connected with, and extends away from, the support ring substantially radially edgewise of the latter.

Additionally, this invention provides a boning knife of the kind above indicated in which the blade has ring gear means thereon, and in which the support ring also forms a cover for the ring gear means and preferably comprises complemental ring members of a resilient character and having the blade circumferentially slidable therebetween.

The invention can be further briefly summarized as consisting in certain novel combinations and arrangements of parts hereinafter described and particularly set out in the claims hereof.

In the accompanying sheet of drawings, forming a part of this specification:

Fig. 1 is an elevation, with portions broken away, showing a boning knife embodying the present invention and in which the support ring for the cutter is viewed in edgewise relation;

Fig. 2 is a longitudinal section taken through the boning knife, as indicated by section line 2—2 of Fig. 1;

Fig. 3 is a transverse section taken through the support ring and cutting blade substantially diametrically thereof as indicated by section line 3—3 of Fig. 2;

Fig. 4 is a fragmentary transverse section taken as indicated by section line 4—4 of Fig. 2 and showing the support ring and cutting blade on an enlarged scale;

Fig. 5 is an elevational view, with portions broken away, of the cutting blade in detached relation;

Figs. 6 and 7 are elevational views showing the complemental ring members of the blade supporting ring and showing such ring members in detached relation;

Fig. 8 is a fragmentary transverse section similar to Fig. 4, but showing a modified form of cutting blade; and Fig. 9 is a fragmentary elevational view with portions thereof broken away, showing another modified construction for this boning knife.

As representing a preferred and highly practical form of construction, Figs. 1 and 2 of the drawings show the improved boning knife 10 as comprising, in general, a handle means 11, a support ring 12 connected with such handle means, and a rotatable cutter or blade 13 mounted on such support ring.

The handle means 11 can assume various different specific shapes, but is here shown as comprising an elongated substantially straight handle member 14 having a substantially cylindrical handgrip portion 14$^a$. The handle means 11 also includes a connecting portion or head 15 at one end thereof to which the support ring 12 is connected, as hereinafter explained, and which connecting portion includes a hollow portion 16 extending substantially tangentially of the support ring 12 and defining a gear chamber 17. The handle member 14 has an axial passage 18 therein in which is located a rotary driving means, such as the flexible rotary shaft 19 shown in this instance.

The support ring 12 provides a substantially circular support on which the cutter or blade 13 is mounted for rotation in its own plane and in the direction of its circumference. This support ring 12 comprises one or more ring members, preferably two such ring members 21 and 22, as shown in this instance, and between which the blade 13 is mounted.

The member 21 constitutes an inner ring member which is a substantially circular resilient member having a split or gap 23 therein at one point of its circumference, and also having an annular groove 24 extending around the outside thereof. The inner ring member 21 also has a pair of connecting lugs 25 and 26 located on opposite sides of the split 23 for use in connecting this ring member with the handle member 14. The leading axial edge of the ring member 21 preferably has an annular bevel 20 thereon.

The member 22 is a substantially circular resilient member forming an outer ring member of a channel-shaped cross-section, such as to provide an annular groove 27 on the inside thereof. This outer ring member 22 has a split or gap 28 therein at one point of its circumference and is provided with connecting lugs 29 and 30 adjacent such gap for use in connecting this ring member with the handle member 14.

The cutter or blade 13 is a ring-shaped blade comprising a substantially circular endless member having an annular ring gear portion 32 adapted to be received between the complemental inner and outer ring members 21 and 22, as shown in Fig. 4, and a tapered portion 33 projecting from the support ring 12 axially thereof and terminating in a circumferentially extending annular cutting edge 34. The ring gear portion 32 carries an annular series of ring gear teeth 32$^a$ which, in this instance, are formed integral with the blade and extend around the outer periphery of such ring gear portion.

In their assembled relation, the inner and outer ring members 21 and 22 are located in substantially radially opposed relation, as shown in Fig. 4, such that the grooves 24 and 27 cooperate in forming an annular channel 35 extending circumferentially of the support ring 12 and in which the ring gear portion 32 of the blade 13 is received. The ring members 21 and 22 are maintained in such cooperating relation by being secured to the head portion 15 of the handle member 14, as by screws 36 which extend through openings 37 of the connecting lugs 25, 26, 29 and 30 of these ring members.

The blade 13 is provided with an annular radial ridge or flange 38 internally thereof which engages in the external groove 24 of the inner ring member 21, and is also provided with an external annular groove 39 in which the annular flange or ridge 40 of the outer ring member 22 engages. The engagement of the ridge 38 in the groove 24, and the engagement of the flange 40 in the groove 39, provide a bearing means for absorbing the axial thrust of the blade when the cutting edge 34 thereof is advanced against the material to be cut during the manipulation of the knife. These engagements also provide labyrinth-type seals for excluding foreign matter from the annular channel 35 of the support ring 12.

The blade 13 is rotatable on the support ring 12 in its own plane and in the direction of its circumference by a circumferential sliding movement of the ring gear portion 32 in the channel 35. This rotation of the blade 13 is, therefore, also a rotation about the central axis 42 which extends transversely to the longitudinal axis 43 of the handle means 11. The central axis 42 extends substantially normal to the longitudinal plane containing the support ring 12, the blade 13 and handle axis 43. It will also be observed that when the support ring 12 and the blade 13 are in their assembled relation on the handle means 11, the substantially straight handle member 14 of the latter extends away from the support ring and blade substantially radially edgewise thereof.

Rotation is imparted to the blade 13 by the rotary driving means of the handle means 11 and which, in this case, includes a rotatable gear member or drive pinion 44 suitably supported in the gear chamber 17 and having meshed driving engagement with the ring gear teeth 32a. In this instance, the gear member 44 is a worm with which a non-circular portion 45 of the flexible shaft 19 is drivingly connected. The flexible shaft 19 extends out of the handle member 14 through a bearing block 46 located therein adjacent its outer end and thence to a power source through a flexible sheath 47.

As mentioned above, the ring members 21 and 22 are resilient and when these ring members are mounted on the handle means 11, they are stressed or sprung slightly radially thereof to permit assembly of the blade 13 therebetween. The inner ring member 21 is sprung inwardly or contracted radially, as is permitted by the gap 23, and such that this ring member will have a tendency to expand radially when the compressive force thereon is released. Similarly, the outer ring member 22 is sprung or contracted radially outwardly during assembly thereof over the blade 13, such that when the expanding force applied to this ring member is released, it will have a tendency to contract radially.

By reason of these self-expanding and self-contracting tendencies of the ring members 21 and 22, respectively, they will cooperate in producing a relative closing movement therebetween, thereby resulting in an assembly in which the blade 13 is hugged by the ring members and in which substantially all lost motion or looseness between the blade and the support ring 12 is removed. The holes 37 and the lugs 25, 26, 29 and 30 of the ring members 21 and 22 are preferably slightly oversize with respect to the stem diameter of the screws 36, such that by merely loosening these screws, the self-expanding and self-contracting tendencies of the ring members will automatically take up any looseness which may develop between the support ring 12 and the blade 13 during use of the knife.

Another important characteristic of the boning knife 10 is that the blade 13 is of a relatively short axial length, such that it will have a minimum amount of resistance to passage through the meat remnant being cut or being severed from a supporting bone. This narrow width or short axial length characteristic of the blade 13 also facilitates the movement of the blade into or through bone depressions or concavities, such as commonly occur in or between the neck bones or other bones having the meat remnants to be removed. It is also an important characteristic of the boning knife 10 that the blade 13 and its support ring 12 are of a diameter or radius of curvature such that the blade will be engageable to best advantage in the majority of the bone concavities or recesses having meat remnants to be removed.

Although the axial length and diameter of the blade 13 are not critical dimensions in a strict sense, they are, however, extremely important to the practical and efficient use of this boning knife for the purpose intended, as has been indicated just above. Thus the blade 13 should preferably have a diameter of at least one inch and not greater than 5 inches. Similarly, the blade should have an axial length of not more than 3/8 of an inch when it is of a diameter of one inch, and its axial length should not exceed one inch when its diameter is of the maximum 5 inches value mentioned just above. From these dimensional values, it will be seen that the axial length of the blade 13 does not exceed the radius of such blade.

During the use of the boning knife 10, the device is held and manipulated in the hand of the operator by gripping the handle member 14. By reason of the fact that the handle member extends edgewise radially outwardly from the support ring 12, the knife can be easily manipulated to bring the rotating cutting edge 34 into cutting engagement with the meat remnant to be removed by advance movement, or movements, of the cutting edge in one or more desired directions, or combinations of directions. Thus, the cutting edge 34 can be advanced into a bone socket or recess with a straight movement in the direction of the rotation axis 42 and, by swinging or rotating the handle member 14, or by a combination of such a swinging and rotation of the handle member, the cutting edge can be made to sweep through the bone recess closely adjacent the bottom thereof to cleanly and completely remove the meat remnant therefrom. During such use of the boning knife 10, the meat remnants pass freely through the central opening 48 of the support ring 12 and the blade 13 and readily drop free of the knife into a suitable container. The annular bevel 20 on the inner ring member 21 will also facilitate the movement of the severed meat remnants through the opening 48.

Fig. 8 of the drawing shows a modified construction for the blade 13 in which a cutting edge 50 of a serrated form is obtained. The serrations are obtained in the cutting edge 50 by constructing the blade so that it carries other tooth portions in the form of a second annular group of teeth 51a axially aligned with the ring gear teeth 51 and which teeth 51a and the intervening tooth recesses extend axially of the blade to the extreme cutting edge thereof. Thus, in this modified construction, the teeth 51a of the ring gear will form serration teeth 52 at the cutting edge 50, and the recesses between the adjacent teeth 51a will form the serration recesses 53 between the pairs of adjacent serration teeth. Such a serrated cutting edge is desirable on the blade 13 for rendering the cutting action thereof more effective. The teeth 51a are separated from the teeth 51 by an annular groove or recess into which a flange 40a of the ring member 22 extends.

Fig. 9 of the drawing shows another modified construction in which the rotary driving means of the handle member 55 comprises a flexible shaft 56 and a train of spur gears connecting such flexible shaft with the rotatable blade 13 in driving relation to the latter. This train of spur gears is here shown as including a bevel gear means comprising right angle gears 57 and 58 suitably mounted in a gear chamber 59 of the handle member 55. The gear 57 is connected with the flexible shaft 56 and the gear 58 is connected with a drive pinion 60 having meshed engagement with the ring gear teeth 61 of the blade 13.

From the accompanying drawing and the foregoing detailed description, it will now be readily understood that this invention provides a boning knife of a very simple and practical form and of a very economical construction and which can be used with great facility and comfort by a workman for removing meat remnants from animal bones. Since the important characteristics and advantages of this boning knife have already been explained above, they need not be here repeated.

Although the boning knife of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. A boning knife for removal of meat from bones comprising, handle means adapted to be manually grasped for holding and manipulating the knife, a ring-shaped cutter having a through axial opening for the passage of severed meat therethrough and a substantially circumferentially continuous axial cutting edge extending around and lying wholly outside of said through opening, said cutter being rotatable in its own plane and about a substantially central rotation axis, means mounting said cutter on said handle means for such rotation of the cutter about said rotation axis and with the rotation axis of the cutter extending transversely to the longitudinal axis of the handle means, and rotary driving means in said handle means and drivingly connected with said cutter to rotate the same.

2. A boning knife for removal of meat from bones comprising, an elongated handle adapted to be manually grasped for holding and manipulating the knife, a ring-shaped cutter having a through axial opening for the passage of severed meat therethrough and a substantially circumferentially continuous axial cutting edge means extending around and lying wholly outside of said through opening, said cutting edge means being moved circumferentially thereof by the rotation of the cutter in its own plane and about a substantially central rotation axis which is substantially normal to such plane, means mounting said cutter on one end of said handle means for such rotation of the cutter about said rotation axis and with the rotation axis of the cutter extending transversely of and in a direction substantially normal to the central longitudinal axis of said handle means, and rotary driving means connected with said cutter and effective thereon through said handle means.

3. A boning knife for removal of meat from bones comprising, handle means adapted to be manually grasped for holding and manipulating the knife, a generally circular cutter rotatable in its own plane and about a substantially central rotation axis, means mounting said cutter on said handle means for such rotation and with the rotation axis of the cutter extending transversely to the longitudinal axis of the handle means, said cutter being a ring-shaped blade of a short axial length in relation to its diameter, said cutter having a through axial opening for the passage of severed meat therethrough and a substantially circumferentially continuous axial cutting edge extending around and lying wholly outside of said through opening, said cutting edge projecting axially beyond said mounting means and being moved circumferentially by the rotation of the cutter, and driving means rotatable in said handle means and connected with said cutter to drive the same.

4. A boning knife as defined in claim 3 in which the axial length of the ring-shaped blade does not exceed the radius of such blade.

5. A boning knife comprising, a handle means adapted to be manually grasped for holding and manipulating the knife, a ring-shaped blade having a through central opening for the passage of severed meat therethrough and a substantially circumferentially continuous axial cutting edge means extending around and lying wholly outside of said through opening, arcuate support means connected with said handle means and supporting said blade with said cutting edge means projecting axially from said support means in an exposed relation, said cutter being movable relative to said support means for rotation in its own plane and about a central rotation axis extending substantially normal to said plane and transversely to the longitudinal axis of said handle means, ring gear means on said blade, and driving means rotatable in said handle means and connected with said blade by means meshing with said ring gear means.

6. A boning knife as defined in claim 5 in which said ring gear means is a worm gear and the rotatable driving ring means includes a worm meshing with said worm gear.

7. A boning knife as defined in claim 5 in which the rotatable driving means comprises spur gear means meshing with said ring gear means and including a bevel gear means.

8. A boning knife comprising, a support ring having a through axial opening, handle means adapted to be manually grasped for holding and manipulating the knife, said handle means having one end thereof connected with said support ring and extending away from said support ring substantially radially edgewise thereof, a ring-shaped blade having a substantially circumferentially continuous axial cutting edge lying wholly outside of said through opening and projecting axially from said support ring in an exposed relation, said blade being substantially annularly coextensive with said support ring and supported by the latter for rotation of said blade relative to the support ring and in the direction of its circumference and in its own plane, and driving means rotatable in said handle means and effective on said blade for causing the circumferential rotation of the latter.

9. A boning knife comprising, a support ring having a through axial opening, handle means adapted to be manually grasped for holding and manipulating the knife, said handle means having one end thereof connected with said support ring and extending away from said support ring substantially radially edgewise thereof, a ring-shaped blade having a substantially circumferentially continuous axial cutting edge lying wholly outside of said through opening, said blade being substantially annularly coextensive with said support ring and supported by the latter with said cutting edge projecting axially therefrom in an exposed relation and for rotation of said blade in the direction of its circumference and in its own plane, ring gear teeth on said blade, and rotary driving means in said handle means and including means meshing with said ring gear teeth for causing the circumferential rotation of said blade.

10. A boning knife as defined in claim 9 in which said blade has other tooth portions thereon substantially axially aligned with said ring gear teeth and extending axially of said blade substantially to said cutting edge, said other tooth portions providing a serrated characteristic on said cutting edge.

11. A boning knife as defined in claim 9 in which said support ring comprises an annularly grooved ring member slidably engaged by said blade and forming a cover means for said ring gear teeth.

12. In a boning knife, a support ring, handle means adapted to be manually grasped for holding and manipulating the knife, said handle means having one end thereof connected with said support ring and extending away from said support ring substantially radially edgewise thereof, said support ring comprising a pair of substantially annularly coextensive complemental ring members, a ring-shaped blade having a ring gear portion slidably rotatable in the direction of its circumference between said ring members, said blade and said support ring having a common through central opening and said blade also having a circumferential cutting edge portion projecting in an exposed relation from said ring members, and rotary driving means in said handle means including means meshing with said ring gear portion for causing the circumferential rotation of said blade.

13. A boning knife as defined in claim 12 in which said handle means has a gear case portion thereon at the location of the connection of said support ring therewith, and in which said rotary driving means includes gear means in said gear case portion.

14. A boning knife as defined in claim 12 in which said ring members are resilient substantially radially opposed outer and inner ring members of which the outer ring member is self-contracting and the inner ring member is self-expanding such that said ring members tend to hug said blade.

15. A boning knife comprising, a ring-shaped support member, handle means adapted to be manually grasped for holding and manipulating the knife, said handle means having one end thereof connected with said support member and extending away from said support member substantially radially edgewise thereof, a ring-shaped blade member having a through opening and a substantially circumferentially continuous axial cutting edge lying wholly outside of said through opening, said blade member being substantially annularly coextensive with said support member and supported by the latter with said cutting edge projecting axially therefrom in an exposed relation and for rotation of said blade member in the direction of its circumference and in its own plane and about an axis extending transverse to the axis of said handle means, ring gear teeth on said blade member, and rotary drive means in said handle means and including means meshed with said ring gear teeth for causing the circumferential rotation of said blade member, one of said members having a substantially radially facing circumferential groove therein and the other member having a substantially radial circumferential ridge portion engaged in said groove.

References Cited in the file of this patent
UNITED STATES PATENTS

| | | |
|---|---|---|
| 2,286,931 | Radeke | June 16, 1942 |
| 2,542,426 | Orling | Feb. 20, 1951 |
| 2,675,842 | Silzle | Apr. 20, 1954 |
| 2,693,728 | Shaff | Nov. 9, 1954 |